(12) United States Patent
Merin

(10) Patent No.: US 6,857,216 B1
(45) Date of Patent: Feb. 22, 2005

(54) DECOY ANCHOR

(76) Inventor: Scott Merin, 1222 Monaco Ct., Stockton, CA (US) 95207

( * ) Notice: Subject to any disclaimer, the term of this patent is extended or adjusted under 35 U.S.C. 154(b) by 0 days.

(21) Appl. No.: 10/751,949

(22) Filed: Jan. 7, 2004

(51) Int. Cl.$^7$ .......................... A01M 31/06; B63B 21/24
(52) U.S. Cl. ................ 43/3; 43/2; 43/44.9; 24/128; 289/13; 114/294
(58) Field of Search .................. 43/3, 2, 44.9, 44.91, 43/43.12; 114/144 B, 293, 294, 303; 289/13; 24/128

(56) References Cited

U.S. PATENT DOCUMENTS

| | | | | |
|---|---|---|---|---|
| 77,628 A | * | 5/1868 | Lothrop ..................... 403/206 |
| 243,954 A | * | 7/1881 | North ............................ 43/3 |
| 364,573 A | * | 6/1887 | Brinkop ......................... 43/3 |
| 1,385,921 A | * | 7/1921 | McNab ..................... 114/303 |
| 2,164,206 A | * | 6/1939 | Gits et al. .................... 16/442 |
| 2,747,315 A | * | 5/1956 | Clemas ........................ 43/3 |
| 2,813,363 A | | 11/1957 | Leckner | |
| 2,929,168 A | * | 3/1960 | Furuto ..................... 43/44.84 |
| 2,955,379 A | * | 10/1960 | Dell .......................... 43/42.35 |
| 3,158,127 A | * | 11/1964 | Gallaugher ................. 114/300 |
| 3,852,907 A | * | 12/1974 | Haught ..................... 43/44.9 |
| 3,898,760 A | * | 8/1975 | Klein ........................ 43/44.83 |
| 3,930,328 A | * | 1/1976 | Knuth ........................... 43/3 |
| 4,090,463 A | * | 5/1978 | Soderberg .................. 114/294 |
| 4,757,630 A | * | 7/1988 | Torberg ........................ 43/3 |
| 4,827,653 A | * | 5/1989 | Sewell ......................... 43/3 |
| 5,168,650 A | | 12/1992 | Martin | |
| 5,822,907 A | | 10/1998 | Lukey | |
| 5,899,014 A | | 5/1999 | Bornhoft et al. | |
| 6,132,144 A | * | 10/2000 | Zueck et al. ............... 405/224 |
| 6,497,069 B1 | * | 12/2002 | Acworth et al. ............ 43/44.9 |
| 2002/0088166 A1 | * | 7/2002 | Halsne ..................... 43/44.9 |

\* cited by examiner

*Primary Examiner*—Teri P. Luu
*Assistant Examiner*—Bret Hayes
(74) *Attorney, Agent, or Firm*—Richard C. Litman

(57) ABSTRACT

A waterfowl decoy anchor for anchoring a floating decoy in a lake or stream for attracting waterfowl to a hunting site or blind. The anchor is typically tied to an eyehole in the lengthwise keel of a decoy by means of a connecting cord having a desired length. The anchor includes an elastic cord segment of latex connected at one end to a "D"-ring for attachment of the connecting cord and, at the other end, to an anchor ball of lead or iron. The other end is threaded through the anchor ball and knotted at the end, the knot being drawn back into a knot cavity within the ball. A cap covers the knot cavity and the ball is sealed up to the tubing with vinyl plastic or rubber, avoiding water pollution and corrosion of the ball. The connecting cord and anchor is wound around the keel for storage.

20 Claims, 4 Drawing Sheets

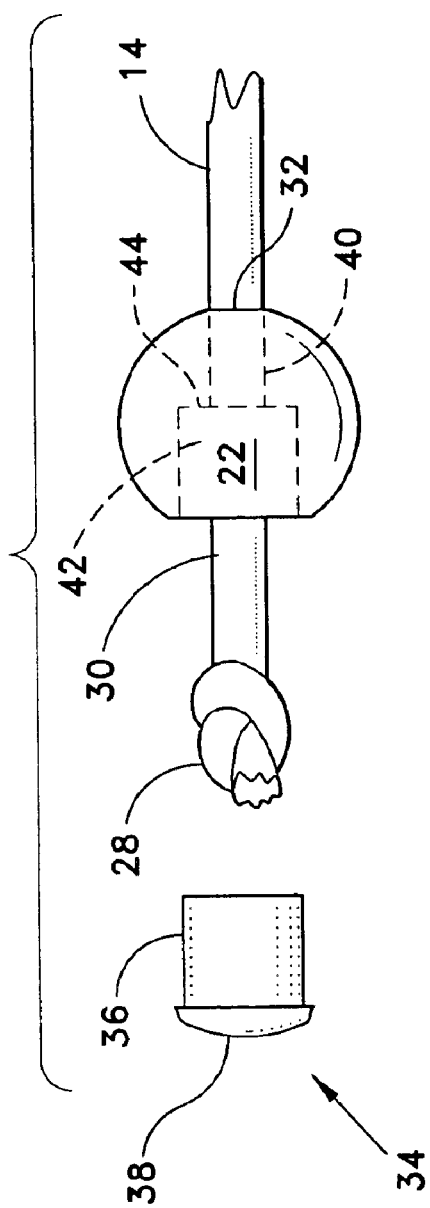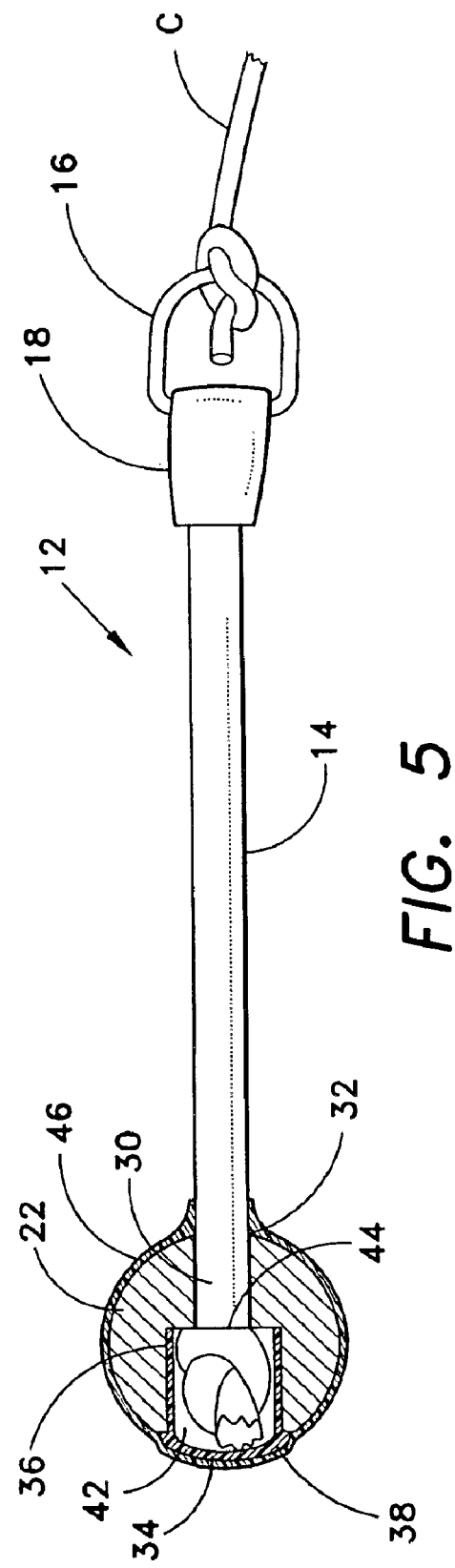

DECOY ANCHOR

BACKGROUND OF THE INVENTION

1. Field of the Invention

The present invention relates to waterfowl decoys for hunting purposes. More particularly, the present invention relates to waterfowl decoy anchors.

2. Description of the Related Art

The use of floating decoys is widespread when hunting for waterfowl, particularly from hunting blinds. A typical decoy floats on a lake or stream and has the shape and color of a waterfowl above the water and may have a weighted keel mounted lengthwise at the centerline of the decoy bottom. In order for the decoys to remain in a desired position, it is necessary to anchor the decoys to the bottom of the lake or stream to avoid movement due to wind or water movement due to tide or river by a length of line, the length of line being determined by the depth of the water, such that the anchor rests on the lake or river bottom while the decoy floats in a natural manner. In the case of decoys having keels, the length of line is tied to the keel. Known decoy anchors are generally made of lead which has been recognized as a pollutant when exposed to water. Also, known decoy anchors tend to be snagged on the bottom with aquatic vegetation. Steel or iron decoy anchors are subject to corrosion during use and storage and become unsightly if not maintained by painting. The paint may also be a pollutant. It would be desirable to provide a decoy anchor which is attractive in appearance, requires little or no maintenance, is non-polluting, and is easily and compactly storable with the decoy.

U.S. Pat. No. 2,813,363, issued Nov. 19, 1957, to Loeckner describes a decoy anchor having a length of elastic material which attaches at one end to a weight and at the other end to a length of cord, which is attached to a decoy. The weight is conical in form and is stored on the bill of the decoy after wrapping the cord around the decoy body and stretching the elastic material to securely fit over the bill.

U.S. Pat. No. 5,822,907, issued Oct. 20, 1998, to Lukey, describes a decoy anchor having a weight slidably mounted on an elastic cord and secured at the lower end of the cord by a crimped loop in the cord having a hook attached to the loop. The elastic cord is connected to a front opening in the keel of the decoy by an inelastic string or cord which, upon storage is wrapped around the keel and the elastic cord stretched to secure the hook in a rear opening of the keel.

U.S. Pat. No. 5,168,650, issued Dec. 8, 1992, to Martin, describes a decoy anchor with a recoil type cord connecting a weight to a decoy, the weight being "U"-shaped to store around the neck of the decoy.

U.S. Pat. No. 5,899,014, issued May 4, 1999, to Bornhoft et al., describes a decoy anchor having a cord with a deformable, resilient tab disposed to be inserted through a weight eyelet and then an opening in the front end of a decoy keel, the weight being slidably held at the lower end of the cord by an eyelet and hook formed into the cord. The anchor may be stored by wrapping around the keel and hooking to itself, the weight being held at the side of the keel.

None of the above inventions and patents, taken either singly or in combination, is seen to describe the instant invention as claimed. Thus, a decoy anchor solving the aforementioned problems is desired.

SUMMARY OF THE INVENTION

The present invention is a waterfowl decoy anchor for anchoring a floating decoy in a lake or stream for attracting waterfowl to a hunting site or blind. The inventive anchor is typically tied to an eyehole in the lengthwise keel of a decoy by means of a connecting cord or line having a length chosen according to the water depth such that the anchor can rest on the bottom while the decoy floats in a natural manner. The inventive anchor includes an elastic cord segment such as a length of latex tubing which is connected at one end to a "D"-ring for attachment of the connecting cord and, at the other end, to an anchor ball of lead or other dense, heavy material such as iron or steel.

The anchor ball is in the form of a sphere and has a radial entry bore opening into a larger knot cavity extending through the anchor ball. The anchor ball receives the end portion of the latex tubing through the entry bore and the ball attached to the tubing by sliding the ball along a portion of the length of the tubing, tying a knot in the tubing, and pulling the ball back such that the knot is held in the knot cavity. The knot is of such size as to prevent the tubing from being pulled through the entry bore. The entry bore is preferably of a diameter slightly larger that the outside diameter of the latex tubing to slidingly receive the tubing. A plastic cap is placed within the knot cavity to provide a generally continuous surface for the spherical anchor ball.

The anchor ball assembly is then coated with a polymer material such vinyl plastic or rubber such as to seal the anchor ball from contact with water, the coating sealing against the latex tubing at the anchor ball entry bore. This provides a protective coating which prevents pollution of the water from a lead ball and corrosion of the ball if made of iron or other material.

The latex tubing is preferably attached to the "D"-ring by forming a hitch type loop which is pulled tight around the straight portion of the "D"-ring. The length of tubing used is preferably about 4–8 inches in length for a duck decoy. The connecting cord or line may be wrapped around the keel connector for storage and the elastic qualities of the latex tubing allow it to be stretched so that the anchor ball may be securely stored under tension between the front end of the keel and the decoy body when not in use. The sealing coating protects the anchor ball from damage and may be of a desired color. In the case of an iron anchor ball the coating avoids the problem of protective paint scaling away and allowing corrosion of the anchor ball. The covered ball shape avoids entanglement of the anchor with aquatic plants.

Accordingly, it is a principal object of the invention to provide a waterfowl decoy anchor which is non-polluting to water.

It is another object of the invention to provide a decoy anchor as above which minimizes fouling in aquatic plants.

It is a further object of the invention to provide a decoy anchor as above which requires minimal maintenance.

Still another object of the invention is to provide a decoy anchor as above which is easily storable on the keel of a decoy.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 4 is a partially exploded view of the decoy anchor of FIG. 1.

FIG. 5 is a sectional view of the decoy anchor of FIG. 1 with the anchor ball sealed on the elastic tubing with a plastic or rubber coating.

Similar reference characters denote corresponding features consistently throughout the attached drawings.

DETAILED DESCRIPTION OF THE PREFERRED EMBODIMENT

The present invention is a waterfowl decoy anchor for anchoring a floating decoy in a lake or stream for attracting waterfowl to a hunting site or blind. The inventive anchor is typically tied to an eyehole in the lengthwise keel of a decoy by means of a connecting cord or line having a length chosen according to the water depth such that the anchor can rest on the bottom while the decoy floats in a natural manner. The inventive anchor includes an elastic cord segment such as a length of latex tubing which is connected at one end to a "D"-ring for attachment of the connecting cord and, at the other end, to an anchor ball of lead or other dense, heavy material such as iron or steel. The anchor ball is covered with a polymeric material to prevent contact with water, thus avoiding lead pollution and anchor ball corrosion.

Figure 1:
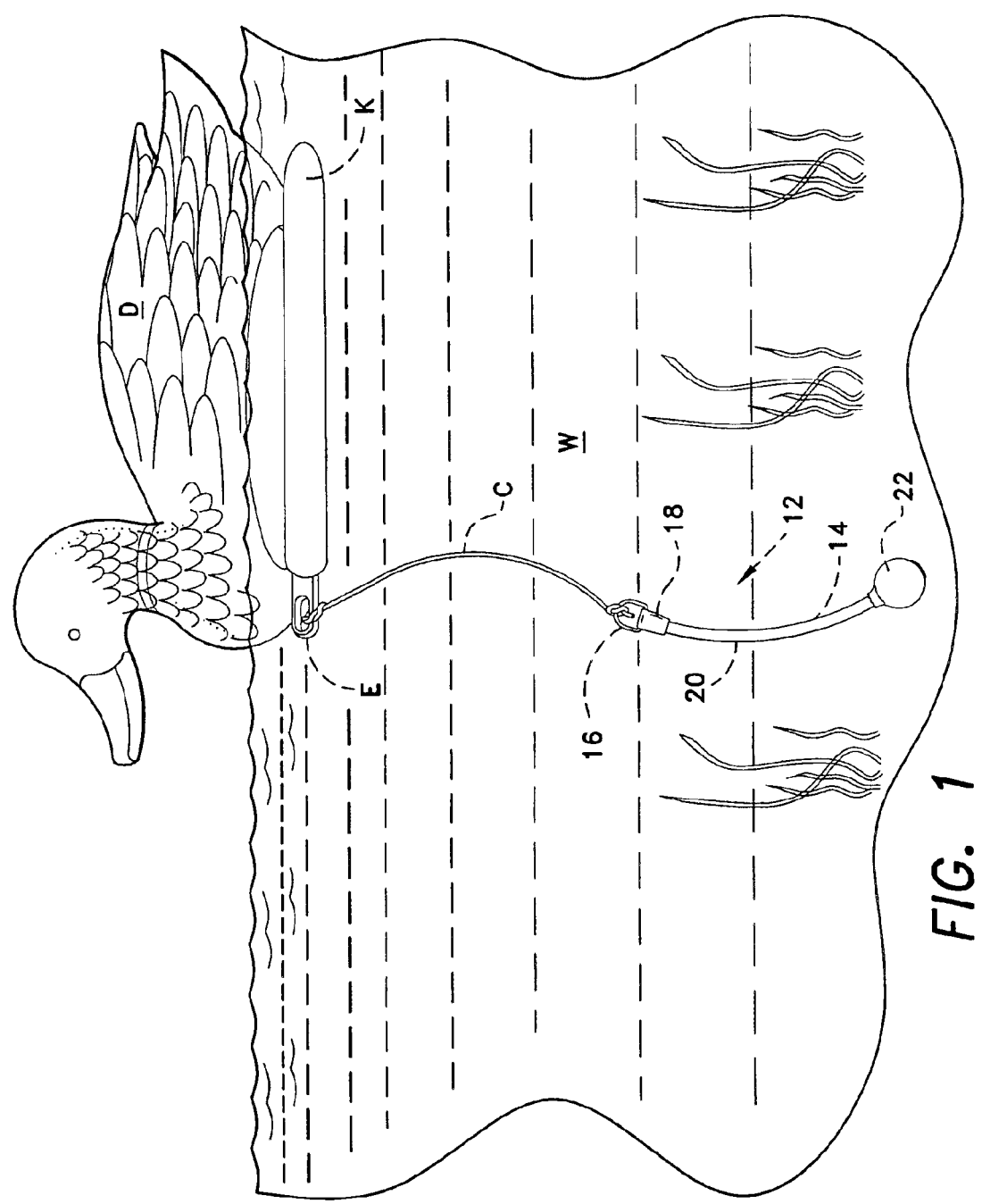
FIG. 1 is an environmental, perspective view of a decoy anchor attached to a decoy during use according to the present invention.

Referring to FIG. 1, there is shown an environmental perspective view of the waterfowl decoy anchor system of the present invention. Decoy anchor system 10 includes a decoy D floating on water W, the decoy having a longitudinal keel K having a keel eyelet E in its forward portion. A cord C of a desired length is tied between decoy D and decoy anchor 12. Decoy anchor 12 rests on the bottom B of the body of water to maintain the decoy D in a desired position. Aquatic plants or weeds may be growing on bottom B. The anchor 12 has an elastic cord or tubing 14 extending between an attachment "D"-ring 16 and an anchor ball 22. The "D"-ring is attached to the tubing 14 at tubing first end portion 20 by a loop hitch knot 18. The cord or line C is tied between the eyelet E on decoy keel K and the "D"-ring 16, thus maintaining a connection between decoy D and anchor 12. The length of cord C may be varied depending on the depth of the water and the area of travel the decoy is allowed, the decoy being set to appear as natural as possible in the water. The cord C is substantially inelastic so as to maintain the desired length during use and may be of any durable cord material.

Figure 2:
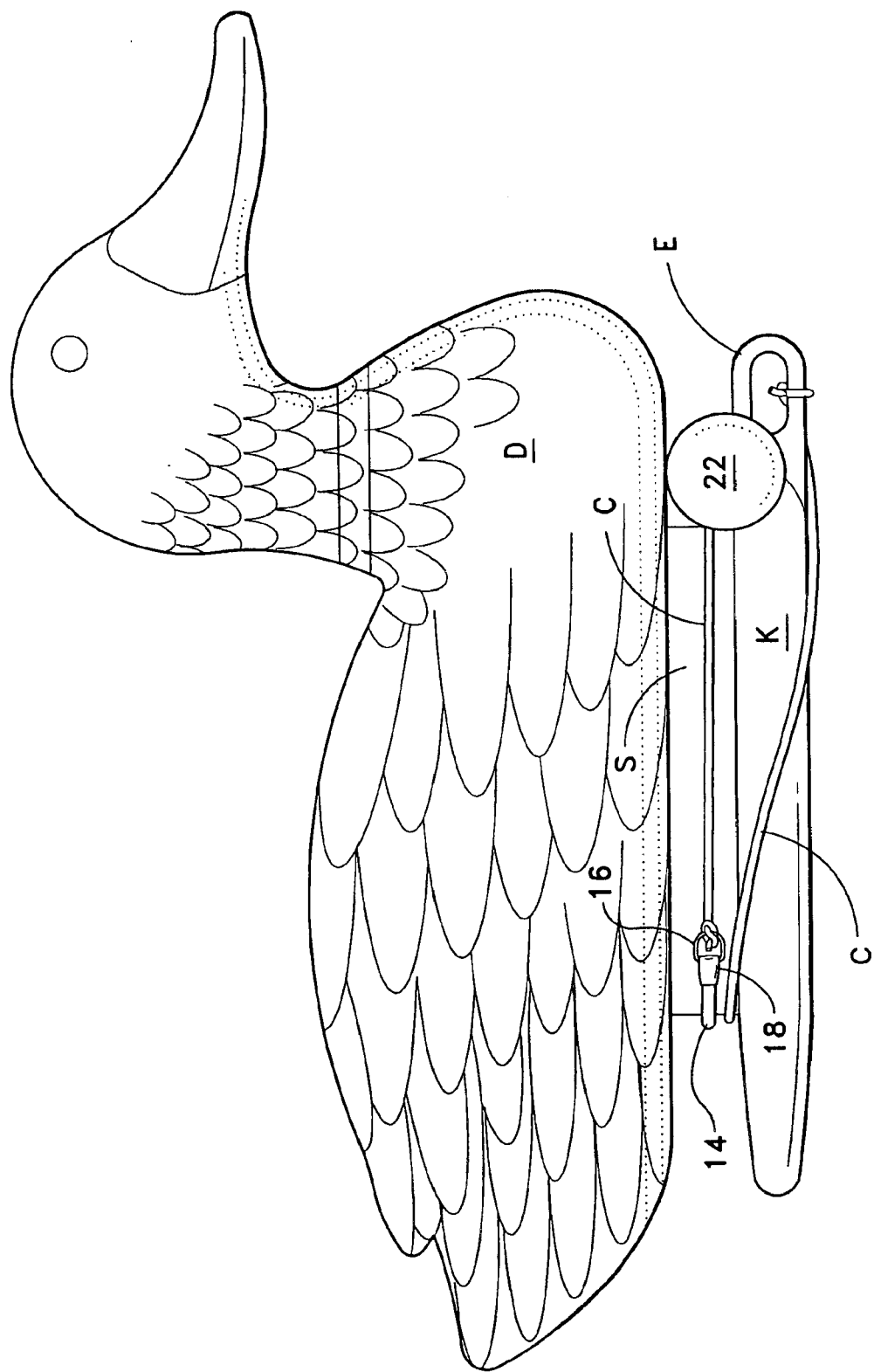
FIG. 2 is a side elevation view of the decoy with the anchor as in FIG. 1 as stored on the keel of the decoy.

Referring to FIG. 2, the decoy anchor system 10 is shown in a stored configuration, where decoy D is removed from the water, exposing keel K as attached to decoy D by a keel support S which is aligned with keel K but is shorter in length, allowing the keel to extend forward and aft of the keel support S. Cord C and latex tubing 14 are wrapped around keel support S. The latex tubing is then stretched such the anchor ball 22 may be placed between the keel K and the decoy D at the fore or aft end of the keel support S. The latex tubing 14 is under tension, maintaining the anchor ball in position to the side of the keel as shown. This results in tangle-free storage in decoy bags. The anchor system 10 may be prepared for use by pulling the anchor ball 22 out and stretching latex tubing 14 enough to clear the decoy body and keel and then unwound around the keel support S until cord C is completely unwound.

Figure 3:
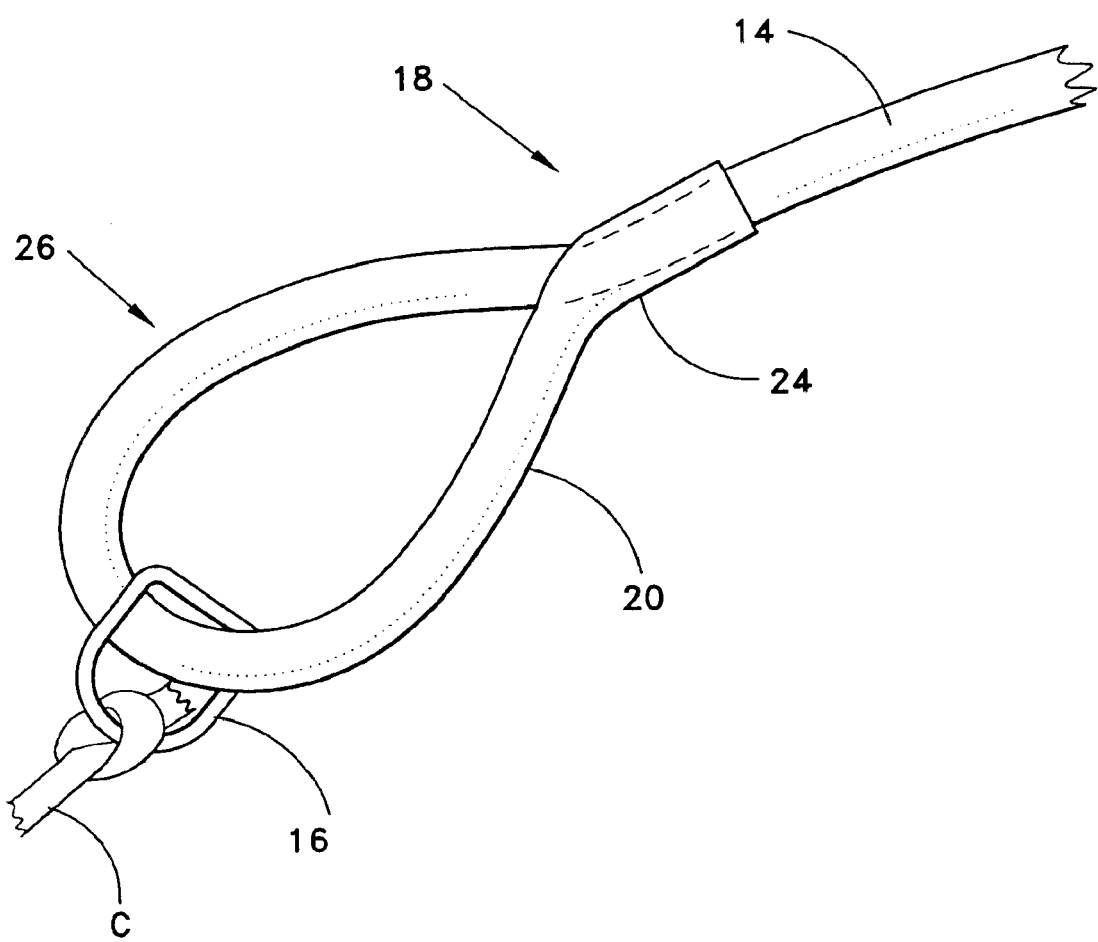
FIG. 3 is a detail view of anchor elastic tubing forming a "D"-ring loop connection as in FIG. 2.

Referring to FIG. 3; there is shown an illustration of how the loop hitch 18 is formed from elastic latex tubing. The tubing 14 is threaded through "D"-ring 16 and then fed through a hole formed in the sidewall of first end portion 20 near first end 24 and pulled through the first end, forming a loop 26. The threading end of the tubing may be cut at an angle to facilitate threading. Further pulling of tubing 14 tightens loop 26 until it forms loop hitch 18 over the straight portion of "D"-ring 16. The cord C may then be tied to the curved portion of "D"-ring 16 by a knot.

Referring to FIGS. 4 and 5, there is shown a partial exploded view and a sectional view of the attachment of anchor ball 22 to latex tube 14 at its second end portion 22 of decoy anchor 12. The second end portion 30 is fed through end portion entrance 32 in anchor ball 22 and through the throughbore first portion 40 and knot cavity 42 (see FIG. 5) so as to extend beyond ball 22. A knot 28 is tied in the end of second end portion 30 and excess tubing trimmed from the end of the knot. Then the tubing 14 is pulled back to pull knot 28 into knot cavity 42 and against knot cavity shoulder 44. A plastic cap 34, having a sidewall 36 and an endwall 38, is inserted into knot cavity 42 so as to cover knot 28, thus securing knot 28 in knot cavity 42. A polymer coating 46, such as a vinyl or rubber coating is applied to the outer surface of the anchor ball and cap and extends around end portion 30 of latex tube 14 so as to seal against exposure of the metal of anchor ball 22 to water and to protect the ball from damage. The coating 46 prevents pollution of the water by lead or other metal and protects the anchor ball 22 from corrosion from exposure to water.

The latex tubing of the invention is preferably about 4–8 inches in length. The metal anchor ball is preferably from about 4 to about 16 ounces in weight, the weight chosen being determined by the environment in which the anchor is to be used, i.e. whether the decoy is to be set in still or in flowing or tidal waters. The color of the coated anchor ball is preferably green, although other colors may be appropriate. The "D "-ring is preferably ½ inch black plastic. The shape of the anchor ball minimizes fouling in aquatic plants during use and retrieval. The diameter of the anchor ball is typically from about ½ to about 2 inches. The elastic tubing is preferably latex tubing having an outside diameter of about ⅜ inch. Other elastic, durable cord or tubing material may be substituted for the latex tubing. The length of the tubing between the anchor ball and the "D" ring is contemplated to be from as little as 2 inches to as much as 12 inches.

It is to be understood that the present invention is not limited to the embodiment described above, but encompasses any and all embodiments within the scope of the following claims.

I claim:

1. A decoy anchor comprising:

an elastic cord segment having first and second end portions;

an attachment ring attached to said first end portion of said elastic cord segment;

a generally spherical anchor ball;

said anchor ball having a diametrically oriented throughbore having a first portion having a first diameter opening at an upper end and a second portion having a second diameter larger than said first diameter and opening at a lower end forming a knot cavity, said first and said second portions defining a shoulder;

said second end portion of said elastic cord segment extending through said first portion of said throughbore and forming a knot at the end thereof;

said knot being located in said knot cavity and being larger than said first portion of said throughbore so as to be retained within said knot cavity against said shoulder;

said anchor ball and said second elastic cord end portion being sealed in an elastomeric material coating.

2. The decoy anchor of claim 1, wherein said elastic cord segment is a segment of elastomeric tubing and said first portion of said anchor ball throughbore having a diameter equal to the outside diameter of said elastomeric tubing such that said elastomeric tubing slidingly engages said first portion of said anchor ball throughbore.

3. The decoy anchor of claim 2, further comprising a cylindrical cap having a sidewall and an endwall, said sidewall extending within and engaging said second portion of said throughbore, said endwall being even with the outer surface of said anchor ball.

4. The decoy anchor of claim 3, said cylindrical cap being formed of rigid plastic material.

5. The decoy anchor of claim 3, wherein said elastomeric tubing is latex tubing.

6. The decoy anchor of claim 1, wherein said elastomeric coating is vinyl plastic or rubber.

7. The decoy anchor of claim 1, wherein said attachment ring is a "D"-ring.

8. The decoy anchor of claim 7, wherein said elastic cord member is elastic tubing and said first end portion of said elastomeric tubing forms a loop securing said "D"-ring.

9. The decoy anchor of claim 8, wherein said loop is formed by inserting the end of said second end portion through an opening in the sidewall of said first end portion, pulling said second end portion through said first portion and out the end thereof, and pulling the remainder of said elastomeric tubing through so as to form a loop or knot over said "D"-ring.

10. A waterfowl decoy system comprising:
   a decoy having a keel and a keel attachment extending along the length of said decoy;
   a decoy anchor comprising;
      an elastic cord segment having first and second end portions;
      an attachment ring attached to said first end portion of said elastic cord segment;
      a generally spherical anchor ball;
   said anchor ball having a diametrically oriented throughbore having a first portion having a first diameter opening at an upper end and a second portion having a second diameter larger than said first diameter and opening at a lower end forming a knot cavity, said first and said second portions defining a shoulder;
      said second end portion of said elastic cord segment extending through said first portion of said throughbore and forming a knot at the end of said elastic cord segment;
      said knot being located in said knot cavity and being larger than said first portion of said throughbore so as to be retained within said knot cavity against said shoulder;
      said anchor ball and said second elastic cord end portion being sealed in an elastomeric material coating; and
   a connecting cord secured between said keel of said decoy and said attachment ring of said decoy anchor.

11. The decoy system of claim 10, wherein said elastic cord segment is a segment of elastomeric tubing and said first portion of said anchor ball throughbore having a diameter equal to the outside diameter of said elastomeric tubing such that said elastomeric tubing slidingly engages said first portion of said anchor ball throughbore.

12. The decoy system of claim 11, further comprising a cylindrical cap having a sidewall and an endwall, said sidewall extending within and engaging said second portion of said throughbore, said endwall being even with the outer surface of said anchor ball.

13. The decoy system of claim 12, said cylindrical cap being formed of rigid plastic material.

14. The decoy system of claim 11, wherein said elastomeric tubing is latex tubing.

15. The decoy system of claim 10, wherein said elastomeric coating is vinyl plastic or rubber.

16. The decoy system of claim 10, wherein said attachment ring is a "D"-ring.

17. The decoy system of claim 16, wherein said elastic cord segment is elastomeric tubing and said first end portion of said elastomeric tubing forms a loop securing said "D"-ring.

18. The decoy system of claim 17, wherein said loop is formed by inserting the end of said second end portion through an opening in the sidewall of said first end portion, pulling said second end portion through said first portion and out the end thereof, and pulling the remainder of said elastomeric tubing through so as to form a loop or knot over said "D"-ring.

19. The decoy system of claim 10, wherein said keel has an eyehole at its forward end and said connecting cord is tied to said keel at said eyehole.

20. The decoy system of claim 19, wherein said elastic cord segment is of such length and elasticity as to allow said connecting cord and said elastic cord to be wrapped around said keel attachment and said elastic cord segment to be stretched sufficiently to hold said anchor ball between said keel and said decoy securely under tension for storage of said decoy system.

* * * * *